United States Patent [19]
Fallon, III

[11] B 3,918,941
[45] Nov. 11, 1975

[54] MIST ELIMINATOR GAS FLOW DEFLECTOR

[75] Inventor: George William Fallon, III, Enfield, Conn.

[73] Assignee: Combustion Engineering, Inc., Windsor, Conn.

[22] Filed: Jan. 2, 1974

[21] Appl. No.: 430,106

[44] Published under the Trial Voluntary Protest Program on January 28, 1975 as document no. B 430,106.

[52] U.S. Cl. .................. 55/230; 55/242; 55/257; 261/81
[51] Int. Cl.² ........................................ B01D 47/00
[58] Field of Search ............ 55/230, 233, 242, 257, 55/294, 96, 222, 223, 431; 261/81

[56] References Cited
UNITED STATES PATENTS

| | | | |
|---|---|---|---|
| 1,554,185 | 9/1925 | Preble | 55/242 X |
| 2,736,390 | 2/1956 | Wickland | 55/242 X |
| 2,878,892 | 3/1959 | Field | 55/242 X |
| 3,407,045 | 10/1968 | Temple | 55/242 X |
| 3,444,670 | 5/1969 | Hungate | 55/242 X |
| 3,499,264 | 3/1970 | Ekman | 55/257 X |

*Primary Examiner*—Frank W. Lutter
*Assistant Examiner*—David L. Lacey
*Attorney, Agent, or Firm*—Frederick A. Goettel, Jr.

[57] ABSTRACT

A U-shaped deflector is provided to deflect the flow of gas from the region of a mist eliminator, in a wet gas scrubber, which is being washed. The deflector is mounted to move backwardly and forwardly with the wash lance under an eliminator plate, while permitting rotatable oscillation of the lance. The deflector is suspended from an overhead beam and serves to partially support the wash lance.

8 Claims, 4 Drawing Figures

MIST ELIMINATOR GAS FLOW DEFLECTOR

BACKGROUND OF THE INVENTION

With air pollution being a prominent problem facing man today, systems have been developed to substantially reduce both the particulate matter and the toxic gases contained in the stack gases resulting from the fossil fuel combustion process. One such system involves the wet scrubbing of the flue gases with a reactive slurry containing calcium in the form of lime or limestone.

In this system the slurry of pulverized limestone or slaked lime is fed directly into a reaction tank (which may be located at the bottom of the gas scrubber) and spraywater pumps convey the scrubbing slurry from the reaction tank to underbed spray nozzles. The incoming flue gas laden with dust and $SO_2$ contacts the sprayed slurry and continues upward to the bed. The removal of $SO_2$ and particulate matter occurs in the bed. The scrubbing cycle continues with the reacted materials draining to the reaction tank which is designed to provide for completion of chemical reactions and precipitation of solids. From the reaction tank the spraywater pumps recirculate the scrubbing solution back to the scrubber bed.

A bleed line from the spraywater recirculation line provides the necessary solids removal to a clarifier or pond where solids settle and clarified water is available for recirculation. The cleansed flue gases then pass through a mist eliminator for removal of any remaining water trapped in the gas. The removal of this water mist from the gas is necessary in order to protect the stack gas reheater and the induced draft fan both of which the gas must pass through before discharge to the atmosphere through the stack. Also, a low moisture level will assist in reducing steam flue formation from the stack.

The mist eliminator assembly within the wet scrubber arrangement typically is comprised of a series of plates which divert the flue gases flowing therethrough, so as to impart forces to the heavier water droplets in the gas for removing the water from the gas stream. With this assembly, however, there is a tendency for corrosive products to build up on the mist eliminator plates with eventual plugging of the scrubber arrangement. It is, therefore, necessary to provide some means for keeping the mist eliminator plates clean.

Various means have thus been developed for keeping the mist eliminator plates clean. The most common arrangement used for this purpose is a spray washer or wash lance, similar to a steam generator soot blower, which keeps the plates from plugging due to corrosive product buildup by periodically spray washing the plates. Experience has shown that in a typical scrubber system the mist eliminator must be cleaned at least once every 24 hours in order to maintain its effectiveness.

Experience has also shown that in order to properly clean the mist eliminator plates and to contunueto protect the stack gas reheater and induced draft fan, the scrubber must be completely removed from service. Such a requirement results in limited boiler capacity, and on systems using more than one scrubber, mist eliminator downtime for washing can handicap full boiler-turbine availability. The solution to this problem has been to provide an extra scrubber module which can be placed in service to temporarily replace the scrubber being cleaned.

SUMMARY OF THE INVENTION

According to the present invention a gas flow deflector carried by a wash lance for a mist eliminator is provided to deflect the upward flow of gas from the region of a mist eliminator which is being washed. The deflector is generally U-shaped and is mounted on the wash lance with the bottom plate underlying the lance and with opposing sides extending vertically upward on opposite sides of the wash lance spary nozzle. The wash lance passes through opposing openings in the side plates and includes restraining means to cause the deflector to move with the lance as it is moved backwardly and forwardly under the mist eliminator. The wash lance is permitted to rotatably oscillate with respect to the deflector in order to permit the nozzle to spray through an arc to facilitate the washing operation.

An overhead support beam is slidably received in opposing openings in the upper ends of the side plates. This beam serves to support the deflector in a pendular fashion and also provides supplementary support to the wash lance.

DESCRIPTION OF THE PREFERRED EMBODIMENT

Figure 1:
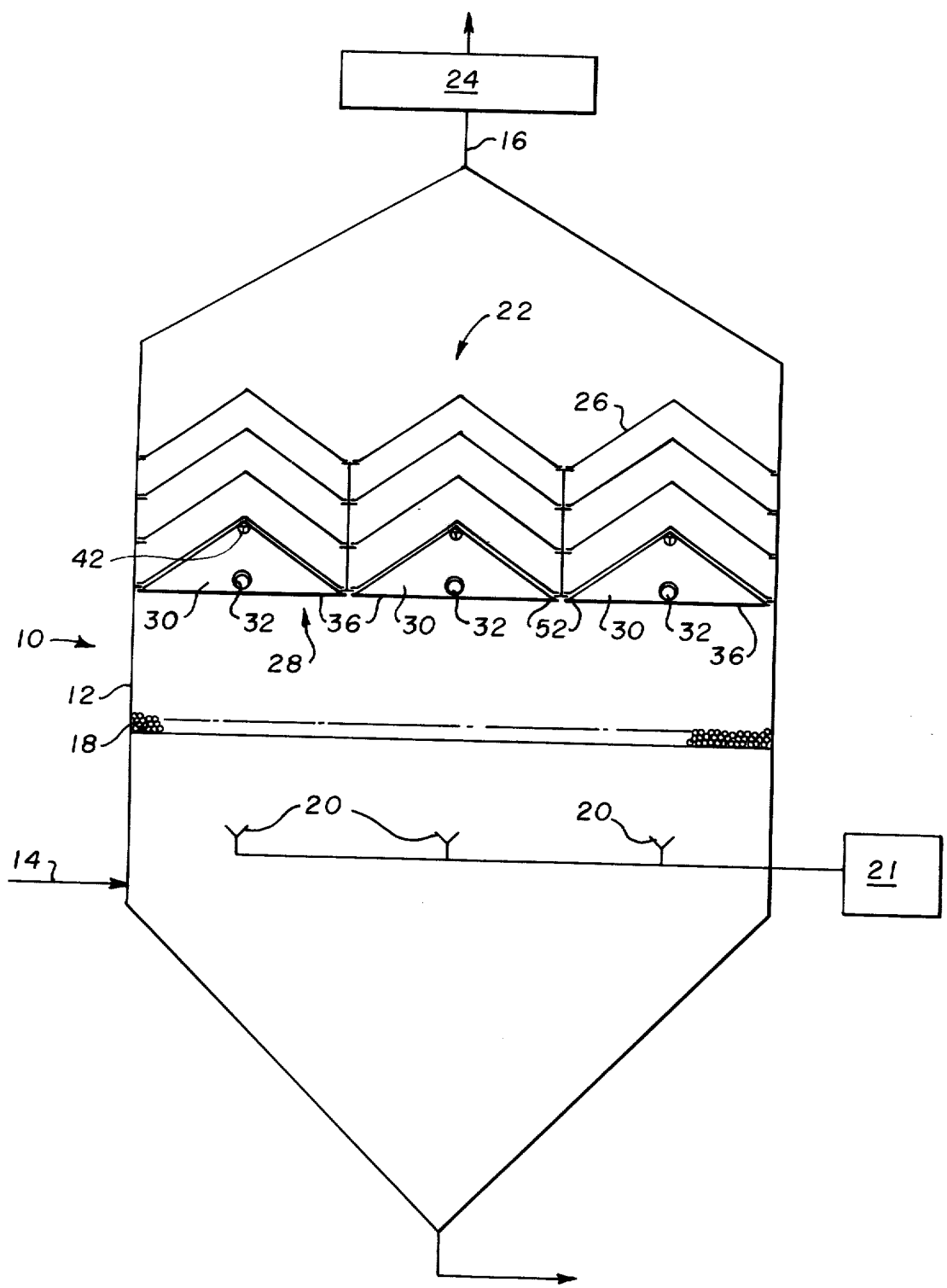
FIG. 1 is a simplified schematic view of a wet gas scrubber air pollution control system having a mist eliminator wash arrangement according to this invention.

Referring to FIG. 1, there is shown the basic elements of an air pollution control system employing the present invention. The wet gas scrubber module is identified generally by the reference number 10. The scrubber comprises an upright housing 12 and the contaminated gas to be cleaned is supplied to the lower end of the housing from a gas supply duct 14. The contaminated gas moves upwardly through the housing 12 for cleaning and scrubbing and after cleaning the gas is discharged from the upper end of the housing to an outlet duct 16 which leads to the stack (not shown) for discharge to the atmosphere. The gas is moved through the scrubber 10 by means of an induced draft fan (not shown) which is located in the outlet duct upstream of the stack.

Mounted within the scrubber housing 12 is a scrubber bed 18 and a series of spary nozzles 20 supplied from a suitable source 21. The incoming gas laden with contaminants contacts the cleaning slurry sprayed from the nozzles 20 and continues upward to the bed. The removal of contaminants occurs in the turbulent layer of gas bubbles and mist which exist in the marble bed 18. The cleansed gas then passes through a mist eliminator assembly 22 for the purpose of removing any water trapped in the gas. Once the gases have traversed the mist eliminator they are drawn through a gas stack reheater 24 by the induced draft fan and thence to the stack for discharge to the atmosphere. The primary purpose of the mist eliminator 22 is to protect the stack gas reheater 24 and the induced draft fan.

Figure 3:
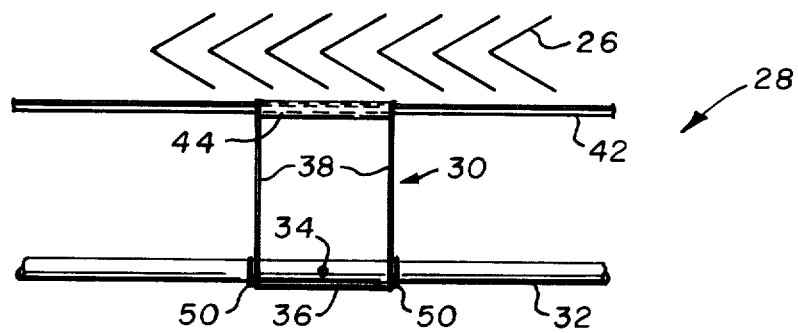
FIG. 3 is an enlarged view of a gas deflector/wash lance assembly shown in operating relationship with several mist eliminator plates.

The mist eliminator, typically, is comprised of a series of plates 26 in a chevron arrangement (see FIG. 1) placed transverse to the gas flow to initiate water removal. Referring to FIG. 3 it is seen that a cross section of these plates 26 presents inclined surfaces which are contacted by the upwardly flowing gas. The mist eliminator plates have a tendency to build up corrosive products during normal operation, due to the solids concentration in the bed and the proximity of the plates to the bed. In order to maintain the effectiveness of the mist eliminator it must be cleaned periodically, typically at least one every 24-hour period.

In order to effectively clean the mist eliminator surfaces 26, with the scrubber 10 in operation and while continuing to protect the reheater 24 and induced draft fan, there are provided wash lance arrangements 28 having gas flow deflectors 30 for locally stopping or deflecting the gas flow through the mist eliminator 22 around the region where the mist eliminator cleaning water stream is directed. FIG. 1 shows three of such arrangements tucked up underneath the mist eliminator bank 22. The gas flow deflectors 30 are mounted on the wash lances 32 and travel with them as they are reciprocated backwardly and forwardly under the mist eliminator assembly 22 with which they are associated.

Figure 2:
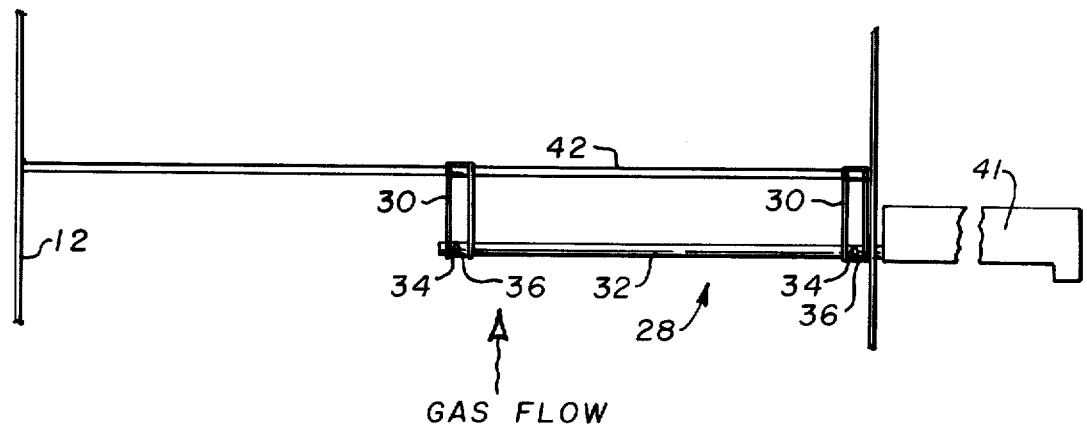
FIG. 2 is a side view of a mist eliminator wash arrangement according to the present invention.

Referring to FIG. 2, the wash lance is similar to a half retract soot blower of the type conventionally used for soot blowing operations on a steam generating boiler. The lance 32 is mounted through the side wall of the scrubber housing 12 with one half of its length extending into the interior of the housing. The other half of the lance extends into a suitable containment 41 on the outside of the scrubber housing 12 where it engages conventional mechanisms within the housing for extending the lance fully into the scrubber housing and for rotatably oscillating the lance. The lance 32 is provided with two wash nozzles 34; one at the end of the lance and the other at the midpoint. Thus, as the lance is extended into the scrubber housing 12 with both nozzles spraying a cleaning fluid the entire mist eliminator surface is washed. Individual gas flow deflectors 30 are mounted on the wash lances 32 to deflect gas flow around each of the wash nozzles 34.

Referring to FIG. 3, the deflectors 30 are generally U-shaped having a rectangular bottom plate 36 underlying the lance 32 and two identically shaped side plates 38 extending vertically above the lance on opposite sides of the nozzles 34. The base plate 36 contains two drain openings 40 to permit excess water and corrosive material to flow back into the scrubber housing.

In the preferred embodiment, the actual support of the gas flow deflectors 30 is provided by a steel T-beam 42 which is positioned in parallel overlying relationship with the wash lance 32, and which extends the full width of the scrubber housing 12. The T-beam 42 extends through the upper ends of the side plates 38 and is welded at its ends to the side walls of the scrubber housing 12 to support the deflectors 30 in a pendular fashion. The engagement of the T-beam 42 with the side plates 38 is made through a circular pipe section 44 which extends between the side plates 38 and is welded to correspondingly-sized circular openings 46 in the side plates. The T-beam 42 extends through this pipe section 44 and the relative sizes of the pipe section and the beam are such that the pipe and thus the deflector 30 may be easily translated along the beam 42. This permits the wash lance 32 and deflectors 30 (which are carried by the lance as will be described below) to move backwardly and forwardly so that water discharged from the nozzles 34 impinges on the entire surface of the plates 26. The wash lance 32 extends through opposing openings 48 in the side walls of the deflector vertically underlying the pipe openings 46 and located adjacent to the base plate 36. The gas deflector 30 is prevented from moving longitudinally with respect to the lance 32 by circumferential collars 50, or the like, which surround the lance 32 on either side of the deflector 30 and which are suitably secured thereto, as by welding. This arrangement will permit rotation of the wash lance 32 with respect to the gas flow deflectors 30.

Figure 4:
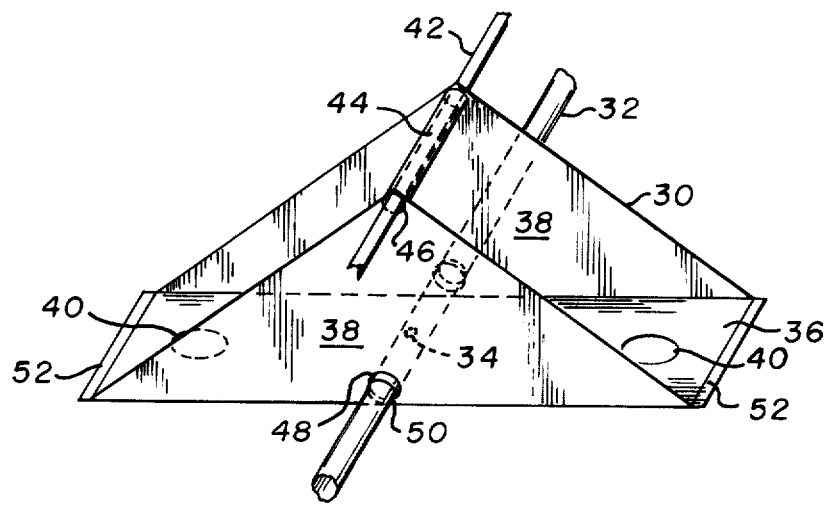
FIG. 4 is a perspective view of a gas deflector/wash lance assembly.

Referring to FIGS. 1 and 4, it will be noted that the side plates 38 are formed in the shape of isoceles triangles having their bases attached to the bottom plate 36. This particular shape is selected in order to achieve maximum gas deflection with the chevron shaped mist eliminator plates 26. If the mist eliminators were another shape, the shape of the deflectors would also be correspondingly selected. For example, if the mist eliminators were straight and horizontal the end plates would be rectangular, or if the mist eliminators were semi-circular the deflector end plates would be correspondingly semi-circular.

Referring still to FIGS. 1 and 4 the open ends of the bottom plate 36 are provided with longitudinal extensions, or pads 52 extending outward from the ends. These pads 52 engage the lower surface of the supporting structure of the mist eliminator 22 (see FIG. 1) and serve to stabilize the gas deflector 30 and to encourage smooth operation when the lance/deflector assembly is being translated through the scrubber housing for washing of the eliminator plates.

The operation of the washing system with the scrubber in service and the mist eliminator dirty is as follows. The wash lance drive mechanism is actuated and extends the wash lance 32 into the scrubber and rotatably oscillates it, with the gas flow deflector riding along and deflecting the upward moving gas around the area being washed. The water from the lance blasts the deposits off the mist eliminator vanes and sluices it away. Excess water and deposits flow through the two holes provided in the horizontal bottom plate of the delfector. When the entire mist eliminator area has been washed, the mechanism is shut off and the wash lance returns to its half retracted position.

While this preferred embodiment of the invention has been shown and described, it will be understood that it is merely illustrative and that changes may be made without departing from the scope of the invention as claimed. For example, the gas flow deflector of this invention could readily be used on a wash lance of the full retract type.

What is claimed is:

1. In a mist eliminator comprising a plurality of spaced plates between which upwardly flowing gases are adapted to pass and presenting inclined surfaces on which solid particles carried by the gas accumulate, means for dislodging said accumulated particles comprising an elongated wash lance, underlying said plates, having at least one spray nozzle therein for discharging a stream of water at high pressure directed toward said inclined surfaces, means for moving said wash lance backwardly and forwardly with respect to said plates so that the discharged water impinges substantially the entire surface of said plates, means for deflecting the gas flow from the region of said plates at which said stream of water is directed, said deflecting means comprising a generally U-shaped deflector having a bottom plate underlying said wash lance and two side plates extending upward from opposing sides of said bottom plate in planes transverse to the longitudinal axis of said wash lance and on opposite sides of each of said at least one spray nozzle, said side plates containing opposing openings through which said wash lance extends, said openings being of a size to permit relative rotation of said wash lance with respect to said deflector, and means for causing said deflecting means to move backwardly and forwardly with said wash lance.

2. The apparatus of claim 1 including means for rotatably oscillating said wash lance and means for engaging said mist eliminator to prevent relative rotation of said deflector with respect to said wash lance.

3. The apparatus of claim 2 wherein said means for preventing rotation of said deflector comprises extensions of said bottom plate adapted to contact the lowermost surface of said mist eliminator plates.

4. The apparatus of claim 1 including means independent of said wash lance for supporting said deflecting means and for partially supporting said wash lance, said means comprising an elongated structural beam supported in parallel overlying relationship with said wash lance and slidably received in opposing openings in the upper ends of said side plates.

5. The apparatus of claim 4 including a pipe section attached to and extending between said openings in said side plates, said beam passing through said pipe section.

6. The apparatus of claim 1 wherein said bottom plate contains at least one drain opening therethrough.

7. The apparatus of claim 1 wherein said means for causing said deflecting means to move with said wash lance comprises retaining means attached to said lance adjacent to and outboard of said openings through which said wash lance extends.

8. The apparatus of claim 1 wherein the vertical profile of said spaced plates is chevron shaped and wherein said side plates are in the shape of isoceles triangles the bases of said triangular plates being attached to said bottom plate, said triangular plates substantially conforming in size and shape to the lowermost of said spaced plates.

* * * * *